Oct. 2, 1956  A. D. BRUNDAGE  2,765,024
AUTOMOTIVE FRONT SEAT REGULATOR
Filed April 6, 1954  3 Sheets-Sheet 1
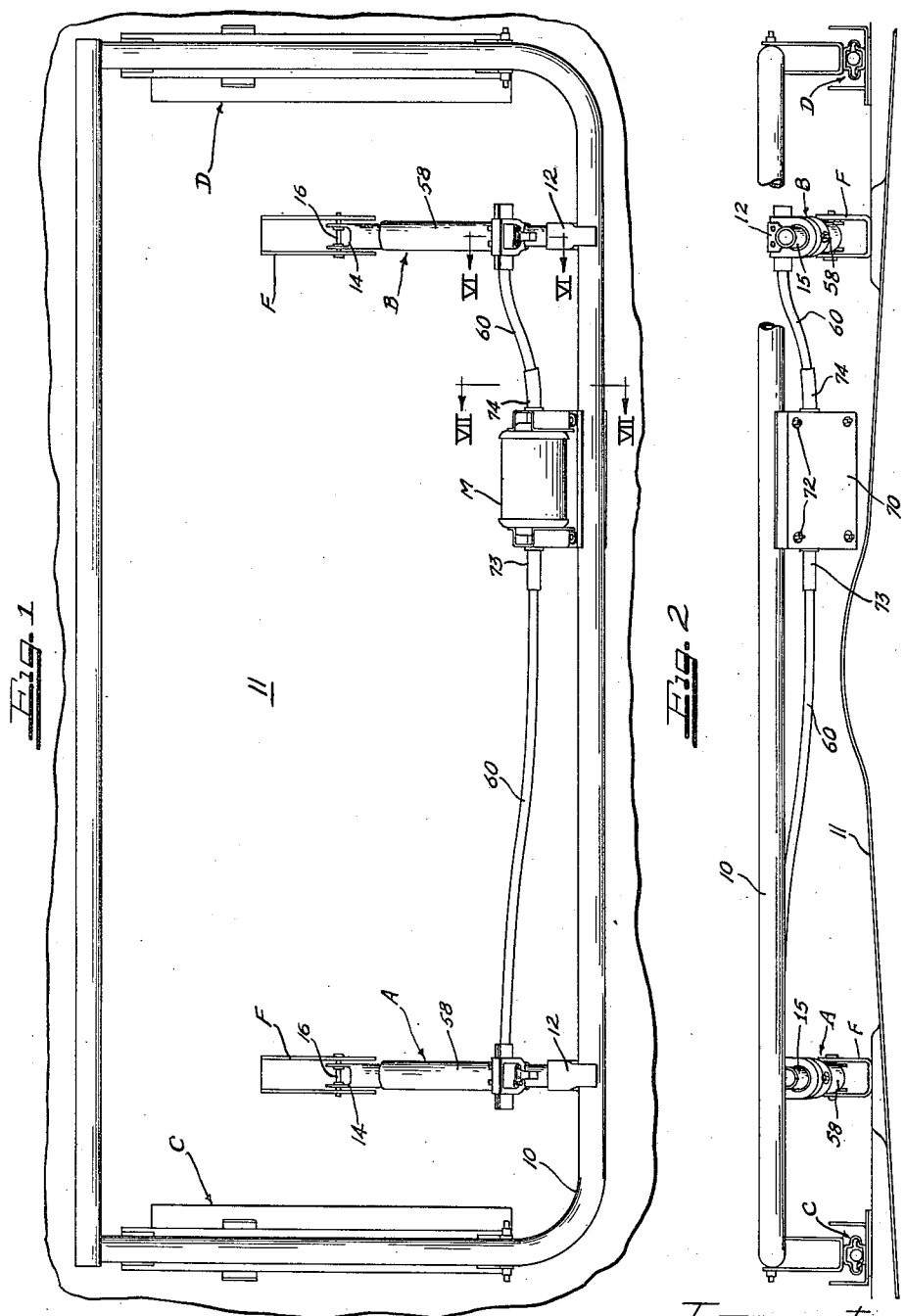
Inventor
ALAN D. BRUNDAGE Oct. 2, 1956  A. D. BRUNDAGE  2,765,024
AUTOMOTIVE FRONT SEAT REGULATOR
Filed April 6, 1954  3 Sheets-Sheet 2
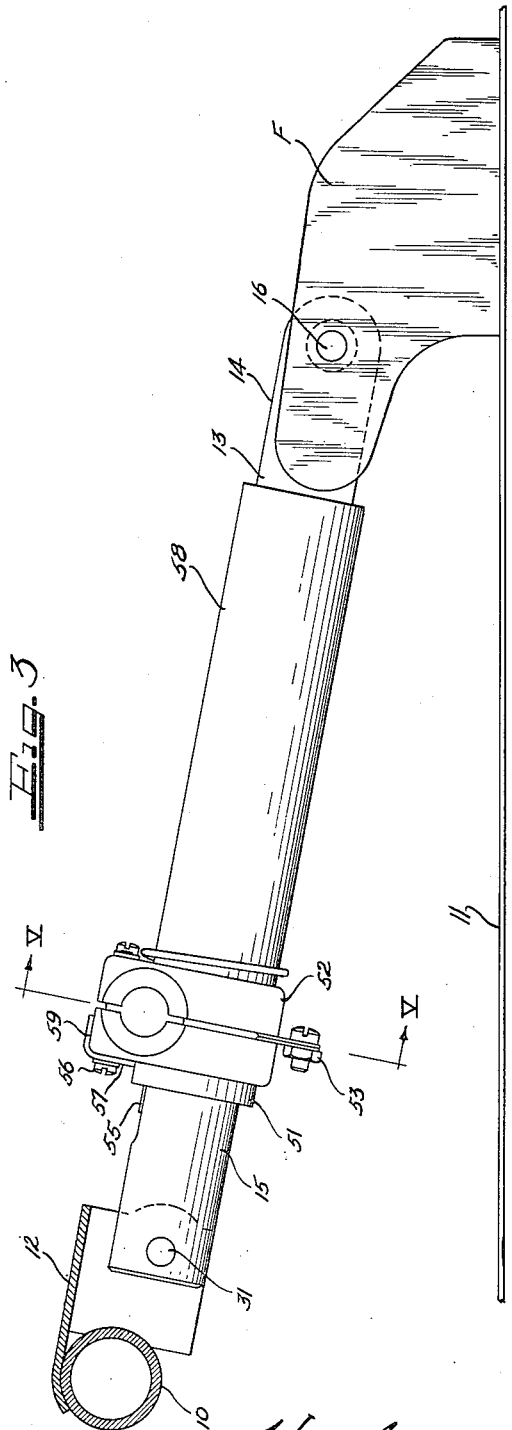
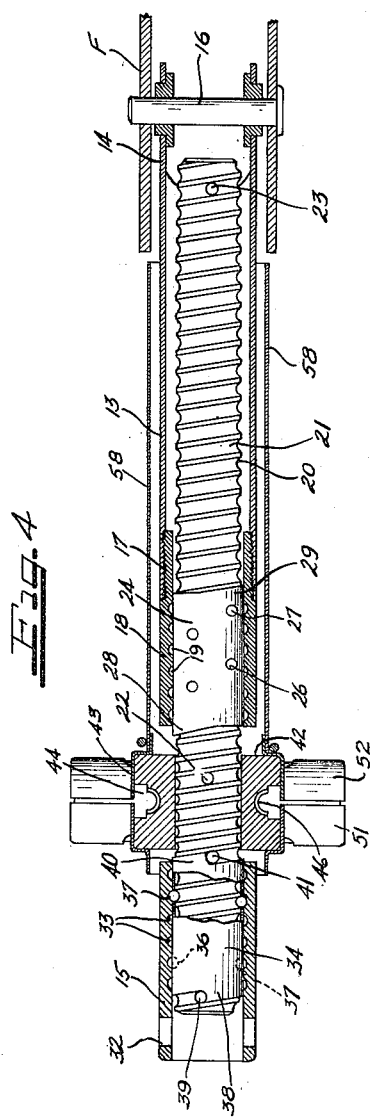
Inventor
ALAN D. BRUNDAGE

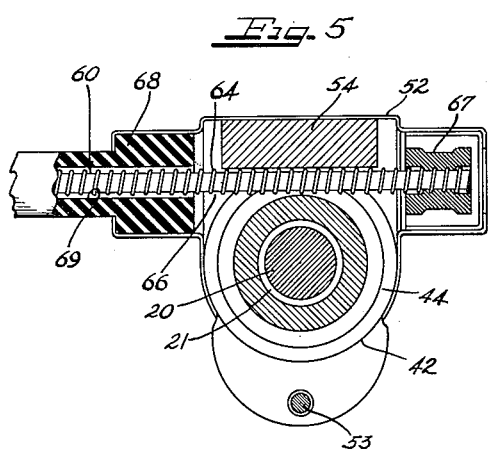
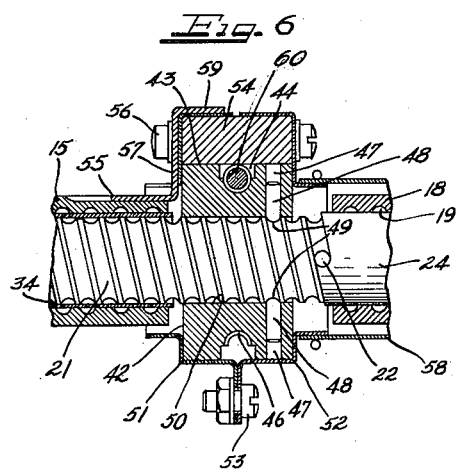
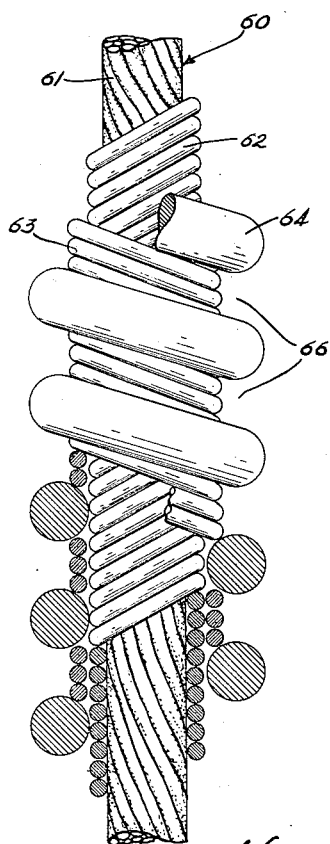
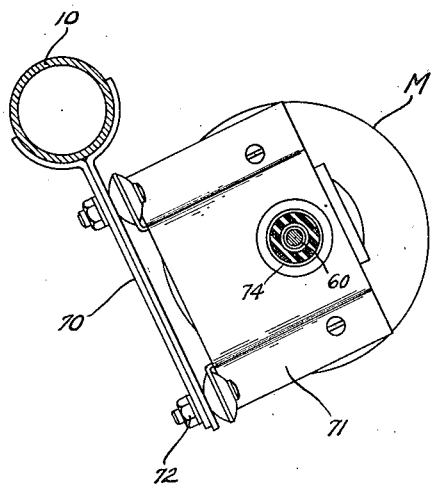

United States Patent Office 2,765,024
Patented Oct. 2, 1956

2,765,024

AUTOMOTIVE FRONT SEAT REGULATOR

Alan D. Brundage, Birmingham, Mich., assignor to Houdaille Industries, Inc., Detroit, Mich., a corporation of Michigan Application April 6, 1954, Serial No. 421,349

11 Claims. (Cl. 155—14)

This invention relates generally to power operated mechanism for adjustably positioning a movable seat in an automotive vehicle and more particularly relates to an arrangement whereby a single drive motor is intermediately disposed between seat slide actuating mechanisms at opposite ends of a movable automobile seat with power take-offs extending from opposite sides of the motor in the form of a flexible cable drivingly connected to each of the seat slide actuating mechanisms, thereby eliminating the necessity of utilizing a seat equilizer rod by simultaneously and concurrently actuating both of said seat slide mechanisms to hold both sides of the seat parallel.

It is an object of the present invention to eliminate the necessity of utilizing a seat equalizer rod in an adjustable seat mechanism.

Another object of the present invention is to provide a motor operated seat mechanism which includes more than one actuating device but in which all of the power operated mechanisms can be operated by a common drive motor.

Yet another object of the present invention is to provide a common drive motor for a multiple actuator device seat adjusting mechanism and flexible cable power take-offs to afford maximum flexibility insofar as motor location with respect to the actuator devices is concerned.

A further object of the present invention is to provide an improved mechanism for converting rotary motion to linear adjustment.

Many other features, objects and additional advantages of the present invention will become manifest to those versed in the art upon making reference to the detailed description which follows and the accompanying sheets of drawings in which a preferred structural embodiment of a seat adjusting mechanism incorporating the principles of the present invention is shown by way of illustrative example.

On the drawings:

Figure 1 is a plan elevational view showing a seat adjusting mechanism provided in accordance with the principles of the present invention;

Figure 2 is an end elevational view of the structure shown in Figure 1;

Figure 3 is an enlarged fragmentary view showing in elevation one of the actuator units provided in accordance with the principles of the present invention;

Figure 4 is a cross-sectional view showing additional details of construction of the device illustrated in Figure 3;

Figure 5 is a cross-sectional view taken substantially on the line V—V of Figure 3;

Figure 6 is a cross-sectional view taken substantially on the line VI—VI of Figure 1;

Figure 7 is a cross-sectional view taken substantially on the line VII—VII of Figure 1; and Figure 8 is an enlarged fragmentary view illustrating additional details of construction of the flexible drive cable utilized in accordance with the principles of the present invention.

As shown on the drawings:

The seat adjusting mechanism of the present invention is particularly suited for use with a seat having a movable frame 10 and adapted to be adjusted by the operator of an automotive vehicle forwardly and backwardly with respect to a floor pan 11 forming part of the automotive vehicle.

In accordance with the principles of the present invention, the usual seat equalizer rod extending transversely of the adjustable automotive seat is completely eliminated through the provision of a single unitary common drive motor M having a driving connection with a plurality of actuating units, the present disclosure showing identically constructed units A and B located towards opposite ends of the seat frame 10 for cooperation with movable seat slide mechanisms indicated at C and D.

Referring first of all to the details of structure of each of the actuating units A and B, it may be noted that the seat frame 10 includes a bracket 12 to which is connected a tubular member 15.

There is further provided an elongated generally tubular actuating member 13, one end of the actuating member 13 being provided with a split yoke portion 14 having a pin 16 passed therethrough for engagement with an anchoring bracket F which is firmly and securely attached to the floor pan 11.

The opposite end of the actuating member 13 comprises an open ended bore partially threaded to receive in firm assembly therewith a reduced diameter neck 17 forming part of a collar 18. The collar 18 is provided with a plurality of parallel longitudinally spaced annular grooves 19 arranged adjacent the end thereof.

A rotatable shaft 20 extends through the collar 18 and projects into the actuating member 13. The shaft 20 is provided with external helical thread means forming a helical groove 21 which extends a substantial portion of the length of the shaft 20. A stop pin 22 is carried by the shaft 20 towards one end of the shaft 20 and a stop pin 23 is carried by the shaft 20 towards the other end of the helical groove 21.

A sleeve 24 comprising a sheet of material rolled into a tubular configuration having an inner diameter corresponding approximately to the outer diameter of the threaded portion of the shaft 20 is located between the shaft 20 and the collar 18.

The sleeve 24 is provided with a plurality of apertures 26, for example, respective pairs of apertures 26 may be provided which are staggered or offset so as to correspond to the thread lead of the helical thread means formed on the shaft 20.

A shiftable element such as a ball 27 is retained by the sleeve 24 in each of the apertures 26. Each of the balls 27 is received in one of the annular grooves 19 of the collar 18 and is also received in the helical groove 21 of the thread means formed on the shaft 20.

Upon rotation of the shaft 20, the balls 27 will move through the helical groove 21, thereby driving the actuating member 13 and the shaft 20 along a linear path of relative displacement with respect to one another. In accordance with the present invention, the actuating member 13 and the shaft 20 are adapted to be moved between two extreme adjusted positions relative to one another corresponding to the forwardmost and the rearwardmost positions of the seat frame 10.

The sleeve 24 is provided with an ear 28 projecting from one marginal edge thereof to engage the stop pin 22 when the shaft is sufficiently telescoped into the actuating member 13 to effect engagement between the stop pin 22 and the ear 28. The sleeve 24 is further provided with an ear 29 projecting from the opposite marginal edge which engages the stop pin 23 when the shaft 20 and the actuating member 13 are sufficiently linearly adjusted with respect to one another.

Upon engagement between the ear 28 and the stop pin 22 or upon engagement of the ear 29 with the stop pin 23, the sleeve 24 will become co-rotatable with the shaft 20 whereupon the balls 27 will move through the annular grooves 19 of the collar 18 and the shaft 20 will be rotatably idle with respect to the actuating member 13.

In accordance with the principles of the present invention, novel means are provided for effecting concurrent rotation of two actuating units adapted to be operated in parallel with one another.

It will be noted that the tubular member 15 is non-rotative by virtue of being firmly assembled to the bracket 12 connected to the seat frame 10 by means of a pin 31. The pin 31 passes through aligned openings 32 formed in the end of the tubular member 15. The tubular member 15 also constitutes a collar member having a plurality of parallel longitudinally spaced annular grooves 33 formed in the bore walls thereof. Moreover, the tubular member 15 is arranged to telescopically receive the end of the shaft 20 and there is further provided a sleeve 34 which comprises a sheet of material rolled into a tubular configuration having an inner diameter corresponding approximately to the outer diameter of the threaded portion of the shaft 20.

The sleeve 34 is provided with a plurality of apertures 36 which may comprise, for example, respective pairs of apertures which are also staggered or offset so as to correspond to the thread lead of the helical thread means formed on the shaft 20.

A shiftable element such as a ball 37 is retained by the sleeve 34 in each of the apertures 36. Each of the balls 37 is received in one of the annular grooves 33 of the tubular member 15 and is also received in the helical groove 21 of the thread means formed on the shaft 20.

As is clearly shown in Figure 4, the sleeve 34 is provided with an ear 38 projecting from one marginal edge thereof and engaging a stop pin 39 carried adjacent the end of the shaft 20.

The sleeve 34 is further provided with an ear 40 projecting from the opposite marginal edge and which is adapted to engage the stop pin 41 carried by the shaft 20. The ears 38 and 40 face in opposite directions so that the sleeve 34 is virtually locked for co-rotation with the shaft 20.

Referring now to Figures 4, 5 and 6, it will be noted that between the tubular member 15 and the collar 18, there is provided a driving collar which is identified by the reference numeral 42. The driving collar member 42 is generally cylindrical in overall configuration and has an annular peripheral surface 43 which is particularly characterized by the provision of an annular groove 44 shaped to provide a plurality of circumferentially spaced teeth 46 for effecting a gear engagement with a driving worm.

As is shown in Figure 6, the driving collar member 42 is provided with a pair of diametrically opposed recesses 47 each of which receives a pin 48 having an inner end 49 which protrudes radially inwardly of a bore 50 extending through the drive collar member 42 for a driving engagement with the helical groove 21 formed in the peripheral surface of the shaft 20.

The drive collar member 42 is enclosed by a housing consisting of opposed shell halves 51 and 52 clamped together by means of a fastener indicated at 53. The housing also encloses a confining block member 54 which is substantially coextensive in width with the driving collar member and through which is passed additional fastening means indicated at 56.

The entire unit including the confining block member 54, the drive collar member 42 and the housing halves 51 and 52 are retained in firm assembly with the tubular member 15 by means of a Z-shaped bracket 57 which has one leg 55 firmly attached to the tubular member 15 and which has another leg 59 overlying a portion of the confining block member 54, the central portion of the bracket member 57 being suitably apertured to pass the fastening means 56.

A tubular dust cover 58 is connected to the housing half 52 and extends toward the bracket F.

The drive collar member 42 is selectively rotated by a two-directional electric motor indicated at M and to effect a driving connection between the motor M and the drive collar member 42, a flexible cable coupling connection indicated generally at 60 is provided.

In accordance with the principles of the present invention, the flexible cable coupling 60 constitutes as shown in Figure 8 a center strand 61 which is wound with additional wire to provide an inner sheath 62 and an outer sheath 63.

On the peripheral surface of the cable coupling 60 there is provided a helically wound strand of wire of enlarged cross-section 64, the helical winding of the strand 64 providing a helical groove 66 whereby the strand 64 is capable of developing the function of a worm. Thus, the cable coupling 60 is confined in the peripheral groove 44 of the drive collar member 42 by the confining block 54 and meshes with the gear teeth 46 so as to provide a positive worm drive for rotating the drive collar member.

As shown in Figure 5, the end of the cable coupling 60 is confined in a bushing 67 enclosed within the housing halves 51 and 52. A bearing bushing 68 is also provided on the opposite side of the drive collar member housing so as to provide a lead-in bore 69 for the flexible cable coupling 60.

In operation, rotation of the cable coupling 60 will effect rotation of the drive collar member 42 and will concurrently rotate the shaft 20 in selected angular direction.

Upon rotation of the shaft 20, relative linear movement will occur between the actuating member 13 and the bracket member F affixed to the floor pan 11 and, consequently, the tubular member 15 connected to the seat frame 10 by the bracket 12 will be moved forwardly or rearwardly depending upon the direction of rotation of the shaft 20. Since the retainer sleeve 34 is pinned to the shaft, no relative translation will occur between the tubular member 15 and the shaft 20.

As shown in Figure 7 and in Figures 1 and 2, a mounting bracket 70 is connected in firm assembly with the seat frame 10 and has spaced apart upstanding bracket portions 71 fastened thereto by connecting means 72 for supporting the motor M in firm assembly with the seat frame 10.

The motor M conveniently comprises an electric motor having drive shaft portions extending out of opposite ends thereof which are directly coupled as at 73 and 74 to the cable couplings 60, 60.

As in clearly illustrated in Figures 1 and 2, the seat frame 10 conveniently comprises a generally rectangular tubularized frame. It may also be noted that the seat slide mechanisms C and D may conveniently comprise any conventional form of seat slide track which will slidably support the seat frame 10 for movement relative to the floor pan 11.

The motor M is carried by the seat frame 10 at any convenient location, for example, it will be noted that in the present embodiment the motor M is displaced towards the right side to facilitate clearance of an upwardly raised center portion in the floor pan 11.

Since both actuator units A and B are simultaneously and concurrently operated by the motor M, both sides of the seat frame 10 will be moved in parallel relation, thereby obviating the necessity of providing a separate seat equalizer rod and further improving the adjustability of the seat mechanism.

Although various minor modifications might be suggested by those versed in the art, it should be understood that I wish to embody within the scope of the patent warranted hereon all such modifications as reasonably and properly come within the scope of my contribution to the art.

I claim as my invention:

1. A seat adjusting mechanism, comprising, an adjustable seat, actuator members connected to said seat at opposite ends thereof to adjust the seat forwardly and backwardly in unison, each actuator member comprising an elongated tube having a first collar at one end formed with an internal annular groove anchored at the opposite end to a support, a shaft having one end extending through said first collar into said tube, and having helical thread means formed thereon, shiftable coupling means between said shaft and said first collar movable in said helical thread means to reciprocate said actuator member between two adjusted positions relative to said shaft corresponding to the forwardmost and rearwardmost positions of the seat in response to the direction of rotation of said shaft, a rotatable collar surrounding said shaft and having radially inwardly projecting lugs received in said helical thread means to lock said shaft for rotation with said rotatable collar when said rotatable collar is rotated, a third collar connected to said seat and formed with an internal annular groove, shiftable coupling means between said shaft and said third collar and movable in said helical thread means, a retaining sleeve between said third collar and said shaft and connected to said shaft for corotation therewith, said retaining sleeve being apertured to provide a recess for each shiftable element, and a common drive motor having a driving connection with each of said rotatable collars, whereupon rotation of said shafts effects relative translation of said shafts and the corresponding elongated tubes for adjusting said seat.

2. A seat adjusting mechanism as defined in claim 1, each of said rotatable collars having an annular peripherally grooved portion providing circumferentially spaced teeth, and a rotatable worm engaging said teeth for each of said rotatable collars and being rotatably driven by said motor.

3. A seat adjusting mechanism as defined in claim 2, said rotatable worm being provided by a flexible shaft having a peripheral helically wound radially outwardly projecting wire.

4. In combination, a single inner, two outer, and two intermediate telescoping members, said inner and both outer members having formed on their respective circumferentially confronting surfaces a helical groove and an annular groove, both of said intermediate members having an opening formed therein in register with said grooves, shiftable means received in said grooves and being confined in said opening, one of said intermediate members being connected to said inner member for corotation therewith, whereupon translation of said inner member will translate a corresponding one of said outer members, the other of said outer members being anchored at one end, whereupon said inner member will be relatively translated with respect to said other outer member in response to relative rotation therebetween to effect linear displacement between both of said outer members.

5. In the combination of claim 4, means for selectively rotating said inner member.

6. In the combination of claim 5, a collar on said inner member having lugs engaging said helical groove and locking said collar to said inner member for corotation therewith, and a two-directional motor having a driving connection with said collar.

7. In the combination of claim 6, said collar having a peripheral groove formed therein providing a plurality of circumferentially spaced teeth, and a worm engaging said teeth and having a driven connection with said two-directional motor.

8. In the combination of claim 6, a flexible cable having a helically wound peripheral radially outwardly projecting worm-forming wire, said collar having a peripheral groove formed therein, providing a plurality of circumferentially spaced teeth for engaging said worm-forming wire, and a coupling connection between said two-directional motor and said flexible cable.

9. In combination, a pair of spaced apart seat slide mechanisms, a seat slidably supported on said slide mechanisms, a two-directional motor having two separate rotatable power take-offs, and an actuator device for each power take-off, each of said actuator devices comprising a single inner, two outer, and two intermediate telescoping members, said inner and both outer members having formed on their respective circumferentially confronting surfaces a helical groove and an annular groove, both of said intermediate members having an opening formed therein in register with said grooves, shiftable means received in said grooves and being confined in said opening, one of said intermediate members being connected to said inner member for corotation therewith, whereupon translation of said inner member will translate a corresponding one of said outer members, the other of said outer members being anchored at one end, whereupon said inner member will be relatively translated with respect to said other outer member in response to relative rotation therebetween to effect linear displacement between both of said outer members, one of said outer members being connected in firm assembly with said seat, the other of said outer members being connected in firm assembly with a support for said seat, and coupling means between said power take-offs and said inner member of each actuator device.

10. In the combination of claim 9, a collar on each respective inner member connected for corotation with said inner member, said collar having a peripheral groove formed therein providing a plurality of circumferentially spaced teeth, said coupling means comprising a worm engaging said teeth and driven by said two-directional motor.

11. In the combination of claim 10, said worm being provided by a flexible cable having a helically wound peripheral radially outwardly projecting worm-forming wire, and means mounting said two-directional motor on said seat.

References Cited in the file of this patent

UNITED STATES PATENTS

| | | |
|---|---|---|
| 1,847,693 | Kindervater | Mar. 1, 1932 |
| 2,181,079 | Dehuff | Nov. 21, 1939 |
| 2,592,166 | McLean et al. | Apr. 8, 1952 |
| 2,600,005 | Kronhaus et al. | June 10, 1952 |

FOREIGN PATENTS

| | | |
|---|---|---|
| 604,335 | France | Jan. 25, 1926 |